(12) United States Patent
Bakkenes et al.

(10) Patent No.: US 9,981,285 B2
(45) Date of Patent: May 29, 2018

(54) DEVICE FOR DOSING AN ADDITIVE SOLUTION

(71) Applicant: Akzo Nobel Chemicals International B.V., Arnhem (NL)

(72) Inventors: Hendrikus Wilhelmus Bakkenes, Apeldoorn (NL); Theodorus Johannes Maria Van Lotringen, Arnhem (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 777 days.

(21) Appl. No.: 14/361,576

(22) PCT Filed: Dec. 3, 2012

(86) PCT No.: PCT/EP2012/074188
§ 371 (c)(1),
(2) Date: May 29, 2014

(87) PCT Pub. No.: WO2013/083503
PCT Pub. Date: Jun. 13, 2013

(65) Prior Publication Data
US 2014/0308442 A1    Oct. 16, 2014

(30) Foreign Application Priority Data
Dec. 5, 2011    (EP) .................... 11191843

(51) Int. Cl.
*B05D 1/30*    (2006.01)
*B05C 5/02*    (2006.01)
(Continued)

(52) U.S. Cl.
CPC ............... *B05D 1/30* (2013.01); *A23L 27/40* (2016.08); *A23P 10/30* (2016.08); *A23P 10/43* (2016.08); *A23P 10/47* (2016.08); *Y10S 118/04* (2013.01)

(58) Field of Classification Search
CPC .......... B05C 5/008; A23L 27/40; A23P 10/43; A23P 10/30; A23P 10/35; A23P 10/47; Y10S 118/04; B05D 1/30
(Continued)

(56) References Cited

U.S. PATENT DOCUMENTS 2,703,760 A * 3/1955 Cunning ............... A23B 7/16
                                                    118/DIG. 4
3,782,632 A * 1/1974 Braun ............... B05B 12/1409
                                                    222/144.5
(Continued)

FOREIGN PATENT DOCUMENTS

CN    1137875 A    12/1996
CN    1351573 A    5/2002
(Continued)

OTHER PUBLICATIONS

Chinese Office Action in Chinese Patent Application No. 2012800581846, dated Oct. 28, 2015; Brief English-language translation of text of Office Action provided.
(Continued)

*Primary Examiner* — Laura Edwards
(74) *Attorney, Agent, or Firm* — McDonnell Boehnen Hulbert & Berghoff LLP

(57) ABSTRACT

Device (1) and method for dosing an aqueous solution (2) of an additive, e.g., a non-caking agent, into an amount of a particulate material, such as a salt. The device comprises a conveyor (4) for transporting the particulate material and a dispenser (5) arranged above the conveyor. The dispenser is connected to a supply for the aqueous solution. The dispenser comprises a pouring outlet (10) extending over at least a part of the width of the conveyor (4). The additive
(Continued)

Figure 1:
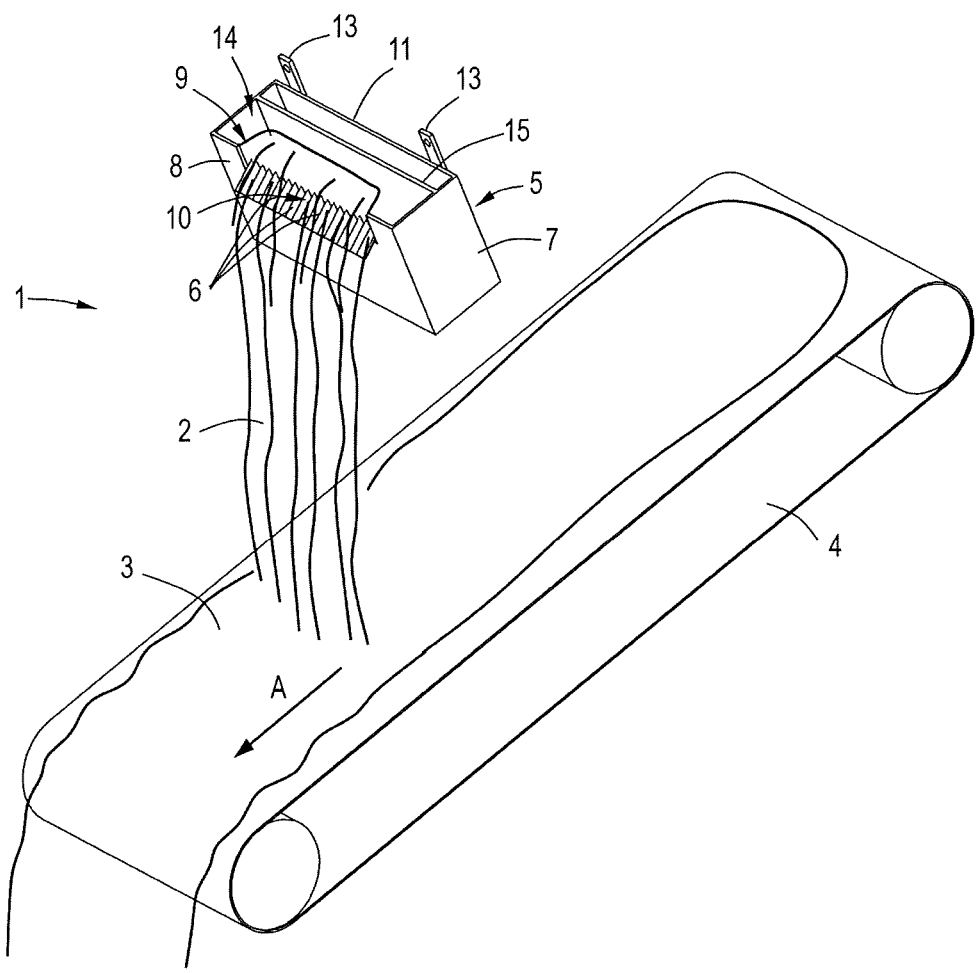

solution is poured with a controlled flow velocity over at least a part of the width of the conveyor (4) transporting the particulate material.

18 Claims, 3 Drawing Sheets

(51) Int. Cl.
    *A23P 10/47*     (2016.01)
    *A23P 10/30*     (2016.01)
    *A23P 10/43*     (2016.01)
    *A23L 27/40*     (2016.01)

(58) Field of Classification Search
    USPC .............. 118/300, 411, DIG. 4, 24; 427/212; 426/302
    See application file for complete search history.

(56) References Cited

U.S. PATENT DOCUMENTS

| | | | |
|---|---|---|---|
| 4,107,274 A | | 8/1978 | Knorre et al. |
| 4,473,027 A | * | 9/1984 | Arfert .................. A23G 9/245 118/16 |
| 5,549,918 A | * | 8/1996 | Hartman ................ A23L 7/191 426/291 |
| 2003/0001288 A1 | | 1/2003 | Tay et al. |
| 2007/0231427 A1 | * | 10/2007 | Ream .................. A23G 3/0021 426/5 |

FOREIGN PATENT DOCUMENTS

| | | |
|---|---|---|
| EP | 0436893 A1 | 7/1991 |
| EP | 2161363 A1 | 3/2010 |
| GB | 2206624 A | 1/1989 |
| JP | H 06312152 A | 11/1994 |
| JP | H 08309179 | 11/1996 |
| JP | 1999179258 A | 7/1999 |
| WO | WO 00/59828 | 10/2000 |
| WO | 200125365 A1 | 4/2001 |
| WO | 2007062650 A1 | 6/2007 |
| WO | 2007065228 A1 | 6/2007 |
| WO | 2010002657 A1 | 1/2010 |
| WO | 2010139587 A1 | 12/2010 |
| WO | 2011073017 A1 | 6/2011 |

OTHER PUBLICATIONS

International Search Report and Written Opinion for International Application No. PCT/EP2012/074188, dated Feb. 28, 2013.
International Preliminary Report on Patentability for International Application No. PCT/EP2012/074188, dated Feb. 20, 2014.
European Search Report for European Application No. EP 11191843.9, search completed on Apr. 25, 2012.
Anti-Caking Agents for Sodium Chloride as Crystal Growth Inhibitor: Interactions studied using various techniques, A.Bode et al. (ISIC 18 (International Symposium on Industrial Crystallization), 2011).

* cited by examiner

DEVICE FOR DOSING AN ADDITIVE SOLUTION

REFERENCE TO RELATED APPLICATIONS

This application is the U.S. National Phase of PCT/EP2012/074188, filed on Dec. 3, 2012, and claims the benefit of EP Application No. 11191843.9, filed on Dec. 5, 2011.

The present invention relates to a method and a device for dosing a solution of an additive, such as a non-caking agent, over a bulk of particulate material, such as a salt, preferably potassium chloride, and more preferably sodium chloride.

Sodium chloride tends to form large, agglomerated masses upon exposure to moisture, particularly during long periods of storage. These hardened masses are generally referred to as cakes. A non-caking agent can be added to the salt to prevent caking. Sodium or potassium ferrocyanide is often used as a non-caking additive. Also the Fe3+ salt of mesotartaric acid (FeMTA) can be used as a non-caking agent, as discussed in WO 2011/073017. Such non-caking agents are typically added to sodium chloride as an aqueous solution.

The non-caking agents, but also other additives for salt, are typically solved into or diluted with water until a desired concentration is obtained. After storage in a buffer tank, the solution is distributed to one or more dosing units. Hitherto, use has been made of dosing units comprising nozzles spraying the solution over an amount of a salt. An example of such a system is disclosed in U.S. Pat. No. 4,107,274. However, such dosing units have the disadvantage that part of the additive solution, which is in the form of a mist, does not end up on the salt. As the additives are relatively expensive, it would be desirable to minimize the loss thereof.

Furthermore, some types of non-caking agents, particularly FeMTA, tend to crystallize and to clog the nozzles of these conventional dosing units. Finally, it has been found that for acidic additives, such as FeMTA, the used equipment and surroundings are exposed to severe corrosion.

It is therefore an object of the invention to provide a device for dosing an aqueous solution of an additive into an amount of a particulate material, whereby the loss of additive is minimized. Furthermore, as many additives (especially non-caking agents for salts, e.g. FeMTA for sodium chloride or potassium chloride) are acidic in nature, it is an object of the invention to provide a device which is especially suitable for dosing an aqueous solution of an acidic additive in order for corrosion of the dosing equipment and surrounding equipment to be reduced and/or clogging problems to be minimized or even prevented.

The objects of the invention are achieved with a device for dosing an aqueous solution of an additive to an amount of a particulate material, the device comprising a conveyor for transporting the particulate material and one or more dispensers arranged above the conveyor, the dispensers being connected to a supply for the aqueous solution of the additive, wherein the dispenser comprises at least one pouring outlet extending over at least a part of the width of the conveyor. By connecting the dispenser to a continuous supply of solution of the additive, the additive can be dosed and metered in a continuous process.

The aqueous solution of the additive is poured under the influence of gravity only, rather than being sprayed on the particulate material. Particularly with acidic additive solutions, it was found that pouring results in substantially less corrosion of the used equipment and surroundings than with spraying. For the sake of clarity, it is noted that the word "pouring" is used to indicate that the solution comes out of the pouring outlet, said pouring outlet preferably comprising a row of evenly distributed pouring spouts, by the use of gravity only instead of via spraying. It is not meant to denote that there is always an uninterrupted stream of liquid. More particularly, the solution can come out by dripping (i.e. in an interrupted stream) or with continuous flows.

To optimize distribution of the additive over the full width of the flow of particulate material (i.e. the full width of the particulate material located on the conveyor), the pouring outlet can be made to have a width corresponding to the width of the conveyor section transporting the particulate material (wherein the wording "conveyor section" denotes the section or part of the conveyor on which the particulate material is located).

The particulate material according to the present invention is preferably a salt. More preferably, it is potassium chloride and most preferably, it is sodium chloride.

The additive according to the present invention is preferably a non-caking agent, and most preferably FeMTA or iron ferrocyanide.

The pouring outlet can for example comprise a row of evenly distributed pouring spouts preferably projecting from a front side of the dispenser to minimize spillage. By "evenly distributed pouring spouts" is meant that the pouring outlet comprises a row of pouring spouts, with said spouts being situated vis-à-vis each other in such a way that there is no more than 50% deviation, preferably 25% deviation, most preferably 10% deviation, in the distances between spouts which are adjacent to each other. By no more than 50% deviation, preferably no more than 25% deviation, and most preferably no more than 10% deviation is meant that if the distance between the two spouts in the pouring outlet which are the closest together is 1 cm, the distance between the other spouts which are adjacent to one another is nowhere larger than 1.5 cm, preferably 1.25 cm, most preferably 1.1 cm. Examples of suitable pouring spouts are gutters, for instance gutters having a V-shaped cross-section. Gutters having a V-shaped cross-section are particularly preferred. The gutters may for example project from the dispenser in a direction corresponding to the direction of transportation of the conveyor, e.g., with a downward inclination in the direction of the conveyor.

The supply of the aqueous solution will preferably open into an inner space of the dispenser. To equalize the flow of solution from the inner space to the spouts, the inner space preferably comprises a weir extending over the width of the inner space and having a lower edge at a distance from the bottom of the inner space. This embodiment has the advantage that the additive solution is evenly distributed over the spouts.

If the pouring outlet is in the form of gutters having a V-shaped cross-section, it is preferred to have the lower end of said gutters (i.e. the overflow edges of said gutters) at the same horizontal level in order to effectuate an even distribution of the additive solution over the gutters. In other words, for optimum distribution of the additive solution over the gutters, it is preferred to have a straight, horizontal pouring outlet and not a pouring outlet which has a slightly hollow or slightly round shape.

Preferably, the device according to the present invention has gutters which slant downwardly from a front wall of the device.

The dispenser can for example be made of a non-corrosive thermoplastic material, such as polyvinyl chloride, polypropylene, polyethylene, and the like.

The conveyor will typically be a belt conveyor. Other conveyors suitable for transporting bulk material can also be used, if so desired.

Optionally, a Cardan suspension may be used to suspend the one or more dispensers. In a Cardan suspension a first pivoted support is supported by a second pivoted support with the two pivot axes being orthogonal. This way, the dispensers remain immobile regardless of the motion of the frame and the aqueous solution can be dispensed constantly and equally over the particulate material.

Using the disclosed device an aqueous solution of an additive can effectively be dosed to a particulate material by pouring the solution with a controlled flow velocity over at least a part of the width of a conveyor transporting the particulate material. Hence, the present invention also relates to a method for dosing an aqueous solution (2) of an additive into a particulate material (3), wherein the solution is poured with a controlled flow velocity over at least a part of the width of a conveyor (4) transporting the particulate material. The solution can for instance be poured by dripping or be poured with continuous flows. With a continuous supply of an additive solution via the dispenser and a continuous supply of the particulate material by the conveyor, the additive can be added in a continuous or semi-continuous process. The solution may comprise further additives or other components, if so desired.

The transport velocity of the, preferably hydrophilic, particulate material and the flow velocity of the solution can be coordinated to obtain a desired mixing ratio. For dosing a non-caking agent to a salt (preferably sodium chloride or potassium chloride) a mixing ratio of about 0.05 to about 5 liters non-caking solution per ton of the salt is particularly useful.

The method according to the present invention is particularly suitable for metering a non-caking agent into a bulk of salt material, e.g., comprising sodium chloride and/or potassium chloride. As described above, suitable non-caking agents for sodium chloride are for example iron ferrocyanide and iron mesotartrate (FeMTA).

After dosing the non-caking agent, the salt (preferably potassium chloride, more preferably sodium chloride) can be further transported.

To obtain good mixing of the metered additive into the particulate material, the particulate material can be deposited onto a next conveyor at a lower level. This step can be repeated a number of times, if so desired.

Figure 2:
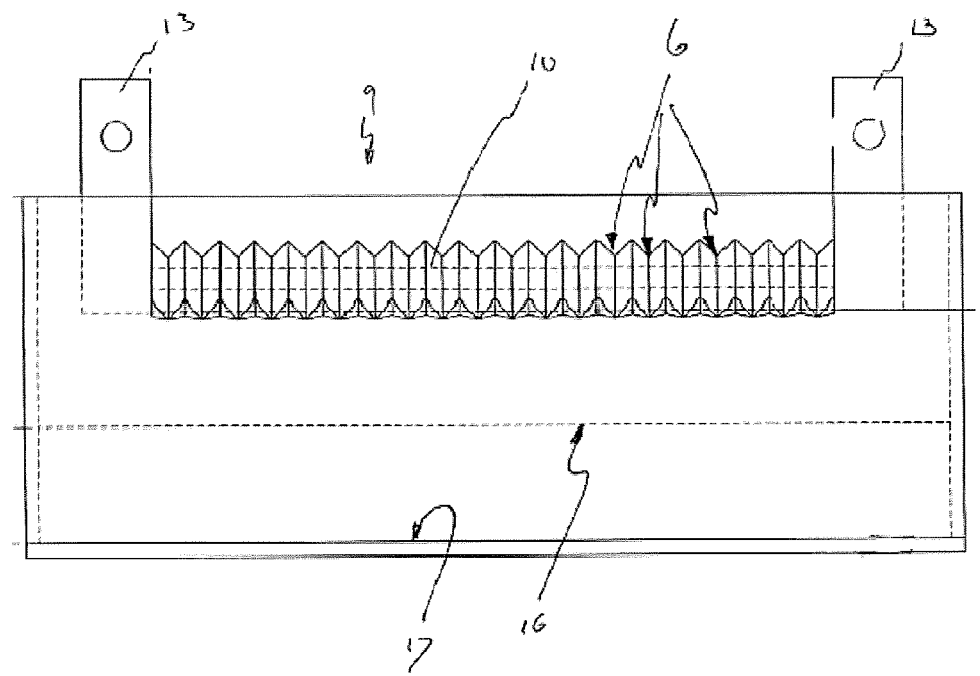
Figure 3:
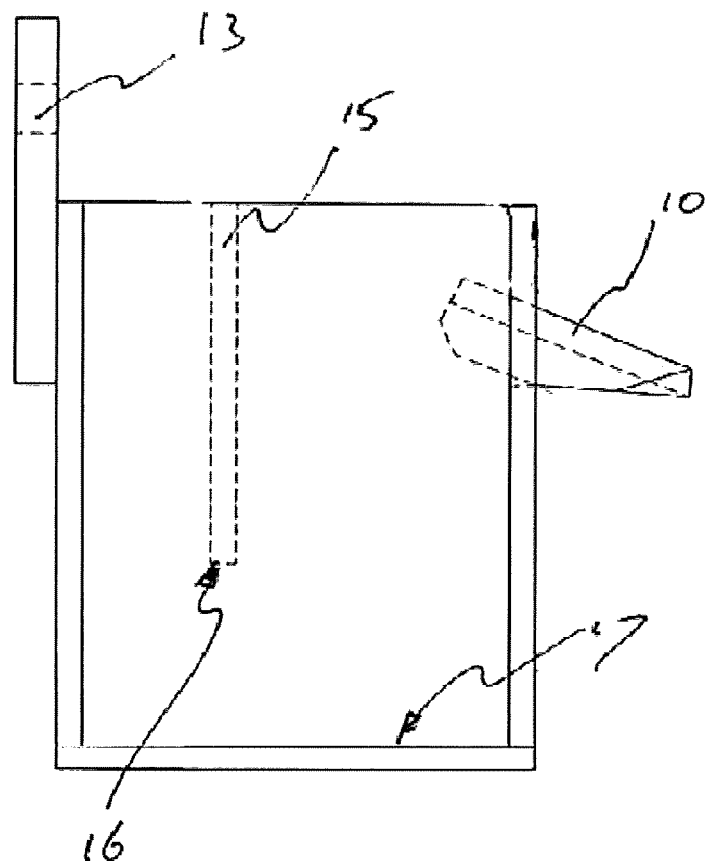

The invention will be further explained with reference to the accompanying drawings showing an exemplary embodiment. In the drawings:

FIG. 1: shows schematically an exemplary embodiment of a dosing device according to the present invention;

FIG. 2: shows a dispenser of the equipment of FIG. 1 in front view;

FIG. 3: shows the dispenser of FIG. 2 in side view.

FIG. 1 shows a dosing device 1 for dosing an aqueous solution 2 of an additive, preferably a non-caking agent, into an amount of a particulate material, e.g. a salt 3 (which is preferably potassium chloride, more preferably sodium chloride). The dosing device 1 comprises a belt conveyor 4 for transporting the particulate material, e.g. a salt 3, and a dispenser 5 arranged above the belt conveyor 4. The dispenser 5 is operatively connected to a supply (not shown) for the aqueous solution of the additive, preferably the non-caking agent. The dispenser 5 comprises a container 7 of a plastic material (for sake of clarity, dispenser 5 denotes the entire dispensing unit, i.e. it comprises the parts 6 to 15). The container 7 has a front wall 8 with a top edge provided with a recess 9. The recess 9 is provided with a pouring outlet 10 formed by row of V-shaped pouring spouts or gutters 6. The gutters 6 project downwardly from the front wall 8 at an angle with the horizontal. The dispenser 5 also comprises a back wall 11 provided with two suspension bars 13 for suspending the dispenser 5 to a frame (not shown). The front wall 8 inclines at an angle of about 10-about 70 degrees with the vertical in the direction of transportation of the belt conveyor 4, indicated with arrow A in the drawing.

The dispenser 5 comprises an inner space 14, which is divided by a weir 15 extending over the full width of the inner space 14. The weir 15 has a lower edge 16 at a distance from the bottom 17 of the inner space 14 (see FIG. 3). The weir 15 helps to equalize the flow of solution to the row of gutters 6.

When the aqueous solution 2 of the additive, preferably a non-caking agent, is supplied via a supply line, the solution 2 flows into the container 7 of the dispenser 5. The solution 2 flows via the gutters 6 and drips or flows straight down under gravity onto the particulate material, e.g. a salt 3 (which is preferably potassium chloride, more preferably sodium chloride) on the belt conveyor 4. If the particulate material is a salt and the additive is a non-caking agent, the transport velocity of the salt and the flow velocity of the non-caking agent solution are preferably coordinated to obtain a mixing ratio of about 0.05-about 5 liters per ton of the salt.

The invention claimed is:

1. A device for dosing an aqueous solution of an additive onto an amount of a particulate material, the device comprising a conveyor for transporting the particulate material and one or more dispensers arranged above the conveyor mounted on a frame, the one or more dispensers suspended and pivotably supported on the frame by a first pivoted support supported by a second pivoted support with two pivot axes being orthogonal, wherein the one or more dispensers are connected to a supply for the aqueous solution of the additive, the one or more dispensers comprising a weir, and wherein the one or more dispensers comprise at least one pouring outlet extending over the width of the conveyor, wherein the pouring outlet
   (a) is formed by a row of gutters slanting downwardly at an angle from the horizontal, and
   (b) is adapted to dose the aqueous solution onto the particulate matter solely by gravity.

2. The device according to claim 1, wherein the gutters are evenly distributed.

3. The device according to claim 2, wherein the gutters have a V-shaped cross-section.

4. The device according to claim 3, wherein the gutters project from a front wall of the one or more dispensers, and wherein the front wall inclines toward the conveyor.

5. The device according to claim 2, wherein the gutters project from a front wall of the one or more dispensers, and wherein the front wall inclines toward the conveyor.

6. The device according to claim 5, wherein the conveyor is a belt conveyor.

7. The device according to claim 1, wherein the one or more dispensers are of a thermoplastic material.

8. The device according to claim 7, wherein the supply for the aqueous solution opens into an inner space of the one or more dispensers, wherein the inner space comprises the weir extending over the width of the inner space having a lower edge at a distance from the bottom of the inner space.

9. The device according to claim 1, wherein the conveyor is a belt conveyor.

10. The device according to claim 1, wherein the one or more dispensers are supported by a Cardan suspension.

11. The device according to claim 1, wherein the supply for the aqueous solution opens into an inner space of the one or more dispensers, wherein the inner space comprises the weir extending over the width of the inner space having a lower edge at a distance from the bottom of the inner space.

12. A method for dosing an aqueous solution of an additive into a particulate material, the method comprising providing the device according to claim 1 pouring the aqueous solution under the influence of gravity with a controlled flow velocity over the width of the conveyor transporting the particulate material.

13. The method according to claim 12, wherein the aqueous solution is dripped over the particulate material.

14. The method according to claim 12, wherein the aqueous solution is poured from the one or more dispensers having a row of pouring outlets inclined towards the conveyor.

15. The method according to claim 14, wherein the particulate material is a salt, the additive is a non-caking agent, and a transport velocity of the salt and the flow velocity of the aqueous solution are coordinated to obtain a mixing ratio of 0.05-5 liters per ton of salt.

16. The method according to claim 12, wherein the particulate material is a salt, the additive is a non-caking agent, and a transport velocity of the salt and the flow velocity of the aqueous solution are coordinated to obtain a mixing ratio of 0.05-5 liters per ton of salt.

17. The method according to claim 16, wherein the particulate material is sodium chloride or potassium chloride.

18. The method according to claim 16, wherein the non-caking agent comprises at least one compound selected from the group consisting of iron ferrocyanide and iron mesotartrate.

* * * * *